United States Patent Office

2,821,546
POLYHYDRIC ALCOHOL ESTERS OF
2,2,3-TRICHLOROPROPIONIC ACID

Herman O. Senkbeil and Charles T. Pumpelly, Midland, Mich., assignors to The Dow Chemical Company, Midland, Mich., a corporation of Delaware No Drawing. Application July 2, 1956
Serial No. 595,061

4 Claims. (Cl. 260—487)

This invention relates to the polyhydric alcohol esters of 2,2,3-trichloropropionic acid. These compounds are viscous liquids or crystalline solids somewhat soluble in many organic solvents and substantially insoluble in water. They have been found to be active as plant growth control materials and are adapted to be employed as active toxic constituents in dust and spray compositions for the control of weeds and for the sterilization of soil with regard to plant growth. Further, the compounds are very persistent in soil and may be distributed in the soil to control the growth of seeds and established vegetation over a prolonged period of time.

The new compounds may be prepared by reacting 2,2,3-trichloropropionic acid with a polyhydric alcohol such as ethylene glycol, propylene glycol, glycerol, erythritol, pentaerythritol, diethylene glycol, triethylene glycol, dipropylene glycol, tripropylene glycol, di(trimethylene) glycol, tri(trimethylene) glycol, hydroxyethoxypropanol, hydroxyethoxyethanol, hydroxyethoxypropoxypropanol and hydroxyethoxypropoxyethanol. Good results are obtained when the 2,2,3-trichloropropionic acid and the polyhydric alcohol are reacted in stoichiometric proportions. However, a large excess of the acid or a small excess of the alcohol may be employed without adverse effect upon the course of the reaction. The reaction may be carried out in the presence of a catalyst such as sulfuric acid and in a water immiscible solvent such as ethylene dichloride, monochlorobenzene or toluene. When the water of reaction is removed as rapidly as it is formed better yields of the desired ester products generally are obtained.

In carrying out the reaction, the 2,2,3-trichloropropionic acid, polyhydric alcohol and catalyst are mixed together and heated at a temperature of 75° to 180° C. until the reaction is complete. When operating at temperatures above the boiling point of water, reduced pressure may be employed to remove the water of reaction as it is formed. In another method of operation, the acid, alcohol and catalyst are dispersed in an inert organic solvent and the mixture heated at the boiling point and under reflux. During the reaction a mixture of solvent and water of reaction is continuously removed from the reaction zone, condensed and the solvent recovered and recycled.

Upon completion of the reaction, the desired product is separated by fractional distillation under reduced pressure. If the desired product is a solid and precipitates in the cooled reaction mixture following removal of the solvent, it may be separated by filtration and purified by recrystallization. In an alternative method of isolating the product, the solvent mixture is neutralized with a dilute aqueous solution of an alkali metal carbonate. The resulting mixture separates into an aqueous layer and a solvent layer. The solvent layer which contains the ester product is separated, washed with water and fractionally distilled under reduced pressure to obtain the desired ester compound.

The following examples illustrate the invention but are not to be construed as a limitation thereof:

Example 1.—Diethylene glycol bis(2,2,3-trichloropropionate)

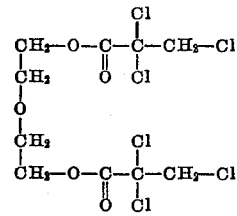

A mixture of 142 grams (0.8 mole) of 2,2,3-trichloropropionic acid, 42.4 grams (0.4 mole) of diethylene glycol and 200 milliliters of ethylene dichloride was heated for 40 hours at a temperature of 95° to 122° C. The heating was carried out with continuous distillation of ethylene dichloride and the water of reaction as formed, separation of the water and recycling of the ethylene dichloride. The reaction mixture was then fractionally distilled under reduced pressure to obtain a diethylene glycol bis(2,2,3-trichloropropionate) product as a viscous liquid boiling at 190°–192° C. at one millimeter pressure. This product had a refractive index $n/D$ of 1.4965 at 25° C., a specific gravity of 1.4975 at 25°/25° C. and a saponification equivalent of 210 compared to the theoretical value of 212.5.

Example 2.—Ethylene glycol bis(2,2,3-trichloropropionate)

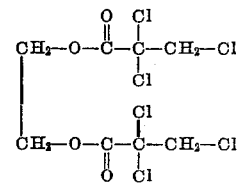

This product which has a molecular weight of 380 was prepared in a manner similar to that described in Example 1 by the reaction of one mole of ethylene glycol and two moles of 2,2,3-trichloropropionic acid. The product had a boiling point of 166°–169° C. at one millimeter pressure and a specific gravity of 1.5647 at 25°/25° C.

Example 3.—Propylene glycol bis (2,2,3-trichloropropionate)

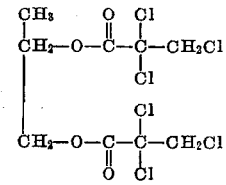

1.5 moles of propylene glycol and 3 moles of 2,2,3-trichloropropionic acid are dispersed in 300 milliliters of ethylene dichloride and heated for 40 hours at the boiling temperature of the mixture and under reflux. The ethylene dichloride and water of reaction are continuously removed during the course of the reaction and more ethylene dichloride supplied as necessary. The mixture is then fractionally distilled under reduced pressure to obtain the desired ester as a viscous liquid having a molecular weight of 400.

Example 4.—Glycerol tris(2,2,3-trichloropropionate)

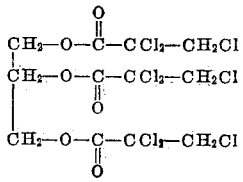

The esterification was carried out by mixing 45.5 grams (0.5 mole) of glycerol, 265.5 grams (1.5 moles) of 2,2,3-trichloropropionic acid, 200 milliliters of ethylene dichloride and 0.2 milliliter of concentrated sulfuric acid. The resulting mixture was heated at the boiling temperature and under reflux for 65 hours during which time the theoretical amount of water produced was removed by continuous distillation with some of the ethylene dichloride. The sulfuric acid and any unreacted 2,2,3-trichloropropionic acid was then removed by washing the reaction mixture several times with water. The ethylene dichloride was removed by distillation and the residue fractionally distilled under reduced pressure to obtain a glycerol tris(2,2,3-trichloropropionate) product as a viscous liquid boiling at 200°–207° C. at 0.3 millimeter pressure. This product had a saponification equivalent of 189 compared to the theoretical value of 190.

Example 5.—Erythritol tetrakis(2,2,3-trichloropropionate)

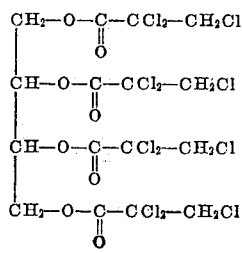

In a similar manner to that described in Example 4 an erythritol tetrakis(2,2,3-trichloropropionate) product may be prepared by reacting 1 mole of erythritol with 4 moles of 2,2,3-trichloropropionic acid.

The following compounds are representative of other polyhydric alcohol esters of 2,2,3-trichloropropionic acid which may be prepared by the procedures described in the foregoing examples:

Di(trimethylene) glycol bis(2,2,3-trichloropropionate) by the reaction of di(trimethylene) glycol and 2,2,3-trichloropropionic acid.

Trimethylene glycol bis(2,2,3-trichloropropionate) by the reaction of 2,2,3-trichloropropionic acid and trimethylene glycol.

Pentaerythritol tetrakis(2,2,3-trichloropropionate) by the reaction of pentaerythritol and 2,2,3-trichloropropionic acid.

1 - (2 - hydroxyethoxy)-2-propanol bis(2,2,3-trichloropropionate) by the reaction of 2,2,3-trichloropropionic acid and 1-(2-hydroxyethoxy)-2-propanol.

Dipropylene glycol bis(2,2,3-trichloropropionate by the reaction of 2,2,3-trichloropropionic acid and dipropylene glycol.

The new 2,2,3-trichloropropionic acid esters are effective as herbicides and as paraciticides for the control of a number of insect and bacterial organisms such as Rhizoctonia solani. For such use the products may be dispersed on an inert finely divided solid and employed as dusts. Such mixtures may also be dispersed in water and employed as sprays. The products may likewise be employed as constituents of oil-in-water emulsions with or without a wetting, dispersing or emulsifying agent. In representative operations, substantially complete controls of the germinant seeds and emerging seedlings of millet and wild oats have been obtained with diethylene glycol bis(2,2,3-trichloropropionate) when applied to soil at the rate of 12.5 pounds per acre to distribute a concentration of about 20 parts by weight of the propionate compound per million parts by weight of the soil.

The di- and tri-ethylene glycols employed as starting materials may be prepared by reacting ethylene glycol with ethylene oxide. The reaction may be carried out in the presence of a catalyst such as sulfuric acid or sodium hydroxide. In one such method, the reactants are mixed together in the presence of the catalyst and heated for about 0.5 hour at a temperature of 170° C. and a pressure of 200 pounds per square inch. The individual glycols can then be separated by subjecting the mixed reaction product to fractional distillation under reduced pressure.

1-(2-hydroxypropoxy)-2-propanol may be similarly prepared by reacting 1,2-propanediol with propylene oxide in the presence of sodium hydroxide, since propylene oxide reacts much faster with a primary alcohol than with a secondary alcohol, and in the presence of the alkaline catalyst, the oxide adds largely as a secondary alcohol. 2-(2-hydroxypropoxy)-1-propanol may be prepared by reacting 1-methoxy-2-propanol with propylene oxide in the presence of an alkaline catalyst to produce 1-(2-methoxyisopropoxy)-2-propanol. The latter product is thereafter heated with hydrogen bromide to give the desired dipropylene glycol and methyl bromide. 2-(2-hydroxy-1-methylethoxy)-1-propanol may be prepared by the reduction of diethyl dilactylate with lithium aluminum hydride (LiAlH₄). The trialkylene glycols of the propylene series may be prepared by reacting these dipropylene glycols with propylene oxide in the presence of sodium hydroxide as catalyst. The term "alkylene" as employed in the present specification refers to any bivalent aliphatic hydrocarbon radical having two free valences attached to different carbon atoms. The polyhydric alcohols to be employed in accordance with the teachings of the specification and claims are those alcohols which are free of reactive groups other than hydroxyl.

The di- and tri-alkylene glycols of the trimethylene series may be prepared by heating 1,3-propanediol with a dehydration catalyst such as iodine. The heating is carried out at a temperature of abuot 175° C. and with the continuous distillation and collection of water of reaction. Upon completion of the reaction as evidenced by the amount of water collected, the mixture may be extracted with a suitable organic solvent and the solvent extract fractionally distilled under reduced pressure to obtain the desired product.

The glycol-ethers containing mixed alkylene units may be prepared by reacting a propanediol, dipropylene glycol or di(trimethylene) glycol and ethylene oxide in the presence of sodium hydroxide. In a similar manner, other mixed glycol ethers may be prepared by reacting diethylene glycol or a mixed glycol-ether with propylene oxide. Other of the mixed glycol-ethers may be prepared by reacting 1,3-propanediol with mixed glycol-ethers of suitable unmixed dialkylene glycols in the presence of iodine as catalyst.

We claim:
1. A fully esterified reaction product of 2,2,3-trichloropropionic acid with an aliphatic polyhydric alcohol containing not to exceed 9 carbon atoms.
2. Diethylene glycol bis(2,2,3-trichloropropionate).
3. Ethylene glycol bis(2,2,3-trichloropropionate).
4. Glycerol tris(2,2,3-trichloropropionate).

References Cited in the file of this patent

UNITED STATES PATENTS

| | | |
|---|---|---|
| 2,257,021 | Pollack | Sept. 23, 1941 |
| 2,634,290 | Sonia et al. | Apr. 7, 1953 |
| 2,732,303 | Morgan et al. | Jan. 24, 1956 |
| 2,734,075 | Brust et al. | Feb. 7, 1956 |